(12) United States Patent
Ohlendorf

(10) Patent No.: US 8,628,719 B2
(45) Date of Patent: Jan. 14, 2014

(54) BLOWN FILM EXTRUSION PLANT

(76) Inventor: Friedrich Ohlendorf, Singen (DE)

( * ) Notice: Subject to any disclaimer, the term of this patent is extended or adjusted under 35 U.S.C. 154(b) by 20 days.

(21) Appl. No.: 13/530,266

(22) Filed: Jun. 22, 2012

(65) Prior Publication Data

US 2012/0256358 A1  Oct. 11, 2012

Related U.S. Application Data

(63) Continuation of application No. 12/136,819, filed on Jun. 11, 2008, now abandoned.

(30) Foreign Application Priority Data

Jul. 11, 2007 (DE) .......................... 10 2007 027 280

(51) Int. Cl.
*B29C 49/64* (2006.01)

(52) U.S. Cl.
USPC .......................................... 264/565; 425/72.1

(58) Field of Classification Search
USPC .......................................... 264/565; 425/72.1
See application file for complete search history.

(56) References Cited

U.S. PATENT DOCUMENTS

| | | |
|---|---|---|
| 2,952,874 A | 9/1960 | Doyle |
| 5,580,582 A | 12/1996 | Achelpohl |
| 2007/0082188 A1 | 4/2007 | Rasmussen |

FOREIGN PATENT DOCUMENTS

| | | |
|---|---|---|
| EP | 0163010 A1 | 12/1985 |
| EP | 163010 A1 * | 12/1985 |

* cited by examiner

*Primary Examiner* — Philip Tucker
*Assistant Examiner* — Vicki Wu
(74) *Attorney, Agent, or Firm* — Bachman & LaPointe, P.C.

(57) ABSTRACT

In a blown film extrusion plant comprising a blow head and an air cooling ring, between the blow head and the air cooling ring at least one cooling device should be provided.

9 Claims, 1 Drawing Sheet

BLOWN FILM EXTRUSION PLANT

CROSS-REFERENCE TO RELATED APPLICATIONS

This application is a continuation application of U.S. Ser. No. 12/136,819, filed Jun. 11, 2008 now abandoned.

BACKGROUND OF THE INVENTION

The invention relates to a blown film extrusion plant comprising a blow head and an air cooling ring and to a method for operating a blown film extrusion plant.

In blown film extrusion, the thermoplastic melt provided by the extruder is shaped in the blow head into a hose. Following exit, the shaped hose is blown up with air from the inside. At the upper end of the film bubble, the inflated film hose is continuously laid flat by suitable guide mechanisms and drawn off by a roll pair.

The molten film hose, from its exit from the nozzle, is intensively cooled with air. This is done with the aid of an air cooling ring, which blows cooling air radially onto the hose from the outside. For the stabilization of the film hose in the turbulent air current, this is led, higher up, through a sizing cage. In blown film plants, an additional internal air cooling with air exchange has nowadays become established. Under the influence of the cooling, the passage of the film from the molten into the solid state is realized, which is achieved at the frost line.

As a result of blow air being blown into the interior of the hose, the molten film hose is widened to the desired diameter. Inside the film hose, a constant slight overpressure prevails. The quotient of the end diameter of the hose and the exit diameter of the blow head is here referred to as the blow-up ratio. At the same time, for the transverse stretching, the hose is longitudinally stretched at the upper end to the desired film thickness by the draw-off rolls, at an increased speed relative to the melt exit speed. The quotient of draw-off speed and exit speed here denotes the draw-off ratio. As a result of the described and concurrent transverse and longitudinal stretching of the film hose, a biaxial elongation of the plastic melt thus takes place following departure from the blow head.

The two variables blow-up and draw-off ratio substantially characterize the influence of the process upon the mechanical film properties of the produced blown film. Apart from the molecular properties, which determine the mechanical properties of a blown film and which are different for each individual polymer, it is namely, in particular, the extent of the stretching and thus the degree of orientation which are responsible for the mechanical properties of a blown film. With increasing orientation, that means with increasing biaxial elongation in the hose-forming zone, the mechanical film properties, such as, for example, tensile strength, can in this case be enhanced.

The generation of the molecular orientation by the biaxial stretching in the hose-forming zone is not, however, irrevocable. Owing to the very strong mobility of the macromolecules which exists at the prevailing temperatures in the hose-forming zone, a part of the orientation is re-formed, already during the stretching, by the orientation relaxation. The orientation relaxation has the effect that the achievable orientation state is not only dependent on the degree of elongation, but is dismantled all the more heavily the longer is the relaxation time and the higher is the relaxation temperature. Both processes, the elongation and the relaxation, end with the achievement of the solid state of the hose film at the frost line.

In blown film extrusion, the maximally possible mass output is in most cases limited by the cooling. It can no longer be further increased if in the hose-forming zone, between the exit of the melt from the blow head and the frost line, bubble instabilities arise due to over-high temperatures of the film hose and an accompanying lower melt strength. The air cooling ring is then no longer capable of cooling the then hotter and less stable film bubble in the turbulent air current in such a way that a stable process is established. A further limitation of the maximally possible output, which is attributable to an inadequate cooling, is the jamming of the film in the draw-off mechanism. In this case, the inner side of the film bubble is so warm that, following flattening of the film hose when the film bubble is squeezed through the draw-off rolls, the film ends up sticking. This occurs, in particular, with thicker films.

The object of the present invention is therefore to improve the cooling of the film bubble in blown film extrusion in such a way that the mass output of the blown film plant can be raised.

SUMMARY OF THE INVENTION

The foregoing object is achieved according to the invention by the introduction of a precooling ring between the blow head and the air cooling ring. This precooling ring cools the film bubble, starting from the melt temperature which the film hose has following departure from the blow head, to a temperature above the softening range of the plastic used, so that the possibility of blowing up the film hose in the region of the air cooling ring is secured.

In the cooling of the film hose, a quantity of heat is given off from this which must be transported away by a liquid or gaseous cooling medium which rinses the precooling ring.

The transport of heat from the film bubble to the precooling ring is here realized on the basis of the contact between the two by thermal conduction, in contrast to the convective cooling of the air cooling ring. The contact of the film bubble against the precooling ring is here ensured by the overpressure within the film bubble. This overpressure is present throughout the blown film extrusion and serves to widen the diameter of the film bubble in the region of the hose-forming zone.

The geometric shape of the precooling ring is cylindrical. In a further advantageous embodiment of the invention, this can also be conical with increasing or decreasing diameter.

The contact surface of the precooling ring is solid and, by thermal conduction, delivers to the cooling medium the quantity of heat absorbed from the film hose. In a further advantageous embodiment of the invention, the contact surface can also be porous, preferably microporous, so that the liquid or gaseous cooling medium enters into direct contact with the film hose.

It proves to be particularly advantageous if the apparatus according to the invention not only raises the mass output of a blown film extrusion plant, but at the same time further improves the tensile strength of the produced film. The influencing of the mechanical properties is here achieved by the fact that, due to the precooling, the biaxial stretching within the hose-forming zone takes place at lower temperatures than occurs in the method according to the prior art. As a result of the precooling with the apparatus according to the invention, the relaxation temperature falls, thereby restricting the relaxation capacity of the plastic film. Hence fewer orientations generated by the biaxial stretching are dismantled and the film, due to the higher degree of orientation, possesses improved mechanical properties.

DETAILED DESCRIPTION

Figures 1, 2:
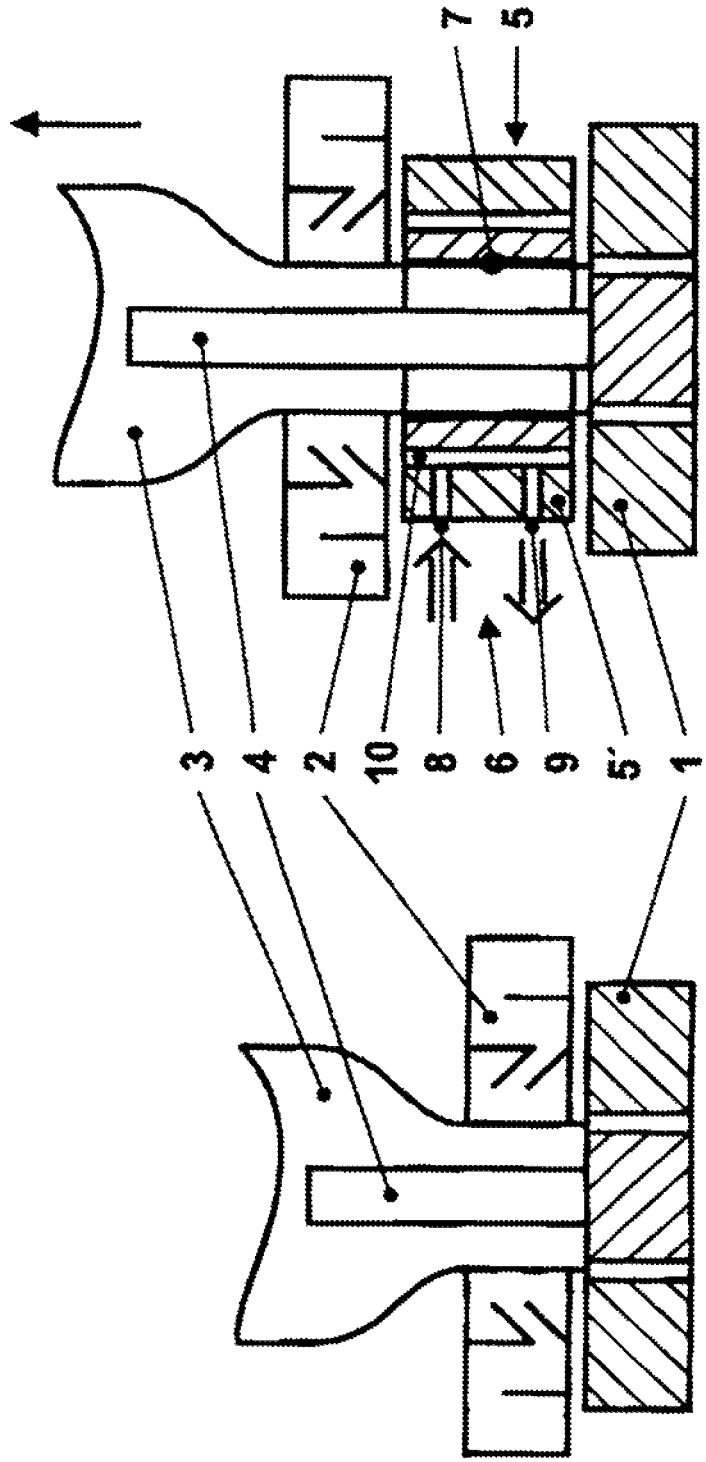
FIG. 1 shows blown film extrusion according to the prior art.
FIG. 2 shows blown film extrusion with the apparatus according to the invention.

In blown film extrusion, the thermoplastic melt provided by the extruder is shaped in the blow head 1 into a hose 3. Following exit from the blow head 1, the shaped hose 3 is blown up with air from the inside. A contact of the film hose 3 with the apparatus 5 according to the invention is thereby established. This cooling device 5 cools the film hose 3 to a temperature above the softening range. The quantity of heat given off by the film hose 3 is transported away by a cooling medium 6, which flows through the precooling ring. The internal air cooling 4 can aid the cooling of the film hose 3 in the region of the precooling ring. In the region of the air cooling ring 2, the film hose 3 is inflated up to the desired diameter and cooled with air from the outside. For the stabilization of the film hose 3 in the turbulent air current, this is led, higher up, through a sizing cage. At the upper end of the film bubble 3, the inflated film hose 3 is continuously laid flat by suitable guide mechanisms and drawn off by a roll pair.

As can further be seen from FIG. 2, liquid and/or gaseous medium can be introduced into the cooling ring 5' via an inlet 8, which flows around one or a plurality of ducts 10 or the like, arranged in the shape of a circular ring, and then exits again via at least one outlet 9. Preferably, as far as the apparatus of the film bubble 3 is concerned, cooling is carried out using the countercurrent method.

In this way, the film bubble 3 can be cooled very rapidly directly following exit from the blow head 1, so that the degree of orientation is thereby increased and hence the strength properties of the film bubble 3 can be markedly improved in an adjustable manner during operation.

It should also lie within the scope of the present invention that the liquid and/or gaseous medium, in particular cooling medium, by virtue of a porous or microporous surface, in particular in the region of a contact surface 7, acts directly upon the film bubble 3 in order to effect a very rapid cooling of the film bubble 3 during operation.

The invention claimed is:

1. Blown film extrusion plant comprising:
   a blow head for producing a film bubble;
   an air cooling ring; and
   a cooling device located between the blow head and the air cooling ring, the cooling device comprises an internal contact surface which contacts the film bubble; and
   conduit means in the cooling device for feeding a cooling medium to the internal contact surface for cooling the film bubble.

2. Blown film extrusion plant according to claim 1, wherein the film bubble from the blow head bears against the internal contact surface of the cooling device.

3. Blown film extrusion plant according to claim 2, wherein the internal contact surface of the cooling device is of rotationally symmetric and cylindrical or conical configuration.

4. Blown film extrusion plant according to claim 1, wherein the conduit means comprises at least one inlet, at least one outlet, and at least one duct in the shape of a circular ring for feeding the cooling medium to the internal contact surface.

5. Blown film extrusion plant according to claim 1, wherein the internal contact surface is in the form of a shell.

6. Blown film extrusion plant according to claim 1, wherein the shell is microporous.

7. Method for producing a film bubble by a blown film extrusion plant wherein a film bubble is extruded from a blow head and is subsequently cooled in an air cooling ring including the step of locating between the blow head and the air cooling ring a cooling device having an internal contact surface which contacts the film bubble, and feeding a cooling medium to the internal contact surface for cooling the film bubble for providing a higher degree of orientation and improved strength properties, as well as an increase in mass output.

8. Method according to claim 7, including adjusting cooling temperature of the film bubble via the cooling device.

9. Method according to claim 7, including feeding the cooling medium through a microporous shell and to the internal contact surface which contacts with the film bubble.

* * * * *